(12) United States Patent
Tracey et al.

(10) Patent No.: US 8,771,005 B2
(45) Date of Patent: Jul. 8, 2014

(54) ELECTRICAL CORD WITH WEAR RING

(71) Applicant: Great Stuff, Inc., Austin, TX (US)

(72) Inventors: James B. A. Tracey, Austin, TX (US); Edwin N. Kretzschmar, Leander, TX (US); Richard Ceraldi, Austin, TX (US)

(73) Assignee: Great Stuff, Inc., Austin, TX (US)

( * ) Notice: Subject to any disclaimer, the term of this patent is extended or adjusted under 35 U.S.C. 154(b) by 11 days.

(21) Appl. No.: 13/724,492

(22) Filed: Dec. 21, 2012

(65) Prior Publication Data

US 2013/0171866 A1 Jul. 4, 2013

Related U.S. Application Data

(60) Provisional application No. 61/582,141, filed on Dec. 30, 2011.

(51) Int. Cl.
*H01R 13/56* (2006.01)

(52) U.S. Cl.
USPC .......................................... 439/445; 439/501

(58) Field of Classification Search
USPC ............. 439/534, 536, 535, 131, 142, 165, 6, 439/651, 445, 501
See application file for complete search history.

(56) References Cited

U.S. PATENT DOCUMENTS

| | | | |
|---|---|---|---|
| 3,390,375 A * | 6/1968 | Salmonson | .................... 439/894 |
| 4,052,751 A | 10/1977 | Shepard | |
| 4,058,735 A | 11/1977 | Tippner | |
| 4,131,805 A | 12/1978 | Austin et al. | |
| 4,153,923 A | 5/1979 | Graf | |
| 4,384,688 A | 5/1983 | Smith | |
| 4,403,143 A | 9/1983 | Walker et al. | |
| 4,713,497 A | 12/1987 | Smith | |
| 5,428,471 A | 6/1995 | McDermott | |
| 5,600,306 A | 2/1997 | Ichikawa et al. | |
| 5,781,015 A | 7/1998 | Duffin et al. | |
| 6,068,490 A * | 5/2000 | Salzberg | .......................... 439/25 |
| 6,165,010 A * | 12/2000 | Prazoff | .......................... 439/534 |
| 6,191,697 B1 | 2/2001 | Hansen et al. | |
| 6,230,109 B1 | 5/2001 | Miskimins et al. | |
| 6,276,502 B1 | 8/2001 | Leyba et al. | |

(Continued)

FOREIGN PATENT DOCUMENTS

WO WO 2013/022791 2/2013

OTHER PUBLICATIONS

International Preliminary Report on Patentability for PCT application No. PCT/US2012/049628, dated Feb. 11, 2014.

(Continued)

*Primary Examiner* — Neil Abrams
*Assistant Examiner* — Phuongchi T Nguyen
(74) *Attorney, Agent, or Firm* — Knobbe, Martens, Olson & Bear, LLP

(57) ABSTRACT

An electrical cord can include a cord segment with a receptacle. The receptacle can have a surface and apertures that accept a plug to form an electrical connection between the plug and wires of the electrical cord. A wear ring can be on the receptacle. The wear ring can be at least as large as the receptacle in a transverse cross-section. The wear ring can inhibit or prevent at least a portion of the surface from contacting a ground surface when the receptacle is on the ground surface or is dragged along the ground surface.

16 Claims, 10 Drawing Sheets

(56) References Cited

U.S. PATENT DOCUMENTS

| | | | |
|---|---|---|---|
| 6,323,652 B1 | 11/2001 | Collier et al. | |
| 6,437,957 B1 | 8/2002 | Karuppana et al. | |
| 6,854,989 B2 * | 2/2005 | Milan | 439/131 |
| 7,136,266 B2 | 11/2006 | Gershen et al. | |
| 7,320,843 B2 | 1/2008 | Harrington | |
| 7,350,736 B2 | 4/2008 | Caamano et al. | |
| 7,419,038 B2 | 9/2008 | Caamano et al. | |
| 7,422,463 B2 | 9/2008 | Kuo | |
| 7,503,338 B2 | 3/2009 | Harrington et al. | |
| 7,510,426 B2 * | 3/2009 | Hwang et al. | 439/501 |
| 7,533,843 B2 | 5/2009 | Caamano et al. | |
| D599,290 S | 9/2009 | Lee | |
| 7,607,603 B1 | 10/2009 | Chang | |
| 7,625,241 B2 * | 12/2009 | Axland et al. | 439/640 |
| 7,657,499 B2 | 2/2010 | Newman et al. | |
| 7,692,904 B2 | 4/2010 | Li et al. | |
| D617,272 S | 6/2010 | The | |
| 7,751,161 B2 | 7/2010 | Williams | |
| 7,973,538 B2 | 7/2011 | Karam | |
| 8,007,295 B2 * | 8/2011 | Lin | 439/131 |
| D651,977 S | 1/2012 | Lee | |
| 8,123,010 B2 | 2/2012 | Skowronski et al. | |
| 8,201,673 B2 | 6/2012 | Caamano et al. | |
| 8,302,895 B2 | 11/2012 | Inman | |
| D685,328 S | 7/2013 | Kirtland | |
| 8,489,622 B2 | 7/2013 | Joshi | |
| 8,500,492 B2 * | 8/2013 | Brown et al. | 439/638 |
| D692,382 S | 10/2013 | Liu | |
| D692,829 S | 11/2013 | Dobler | |
| 2007/0255833 A1 | 11/2007 | Sharma | |
| 2008/0223951 A1 | 9/2008 | Tracey et al. | |
| 2012/0049653 A1 | 3/2012 | Tracey et al. | |
| 2013/0032654 A1 | 2/2013 | Tracey et al. | |
| 2013/0171865 A1 | 7/2013 | Ceraldi et al. | |

OTHER PUBLICATIONS

International Search Report and Written Opinion for application No. PCT/US2012/049628, mailed on Oct. 26, 2012, by Blaine R. Copenheaver.

Masterplug Switched 4 Socket Cable Reel, accessed on Nov. 2, 2011 at http://www.screwfix.com/p/masterplug-switched-4-socket-cable-reel-work-power-30m-13.

Master Plug Performance 2 Socket Cable Extension Reel, accessed on Nov. 2, 2011 at http://www.ck-supplies.com/index.php?catID=1233&prodID=7168.

* cited by examiner

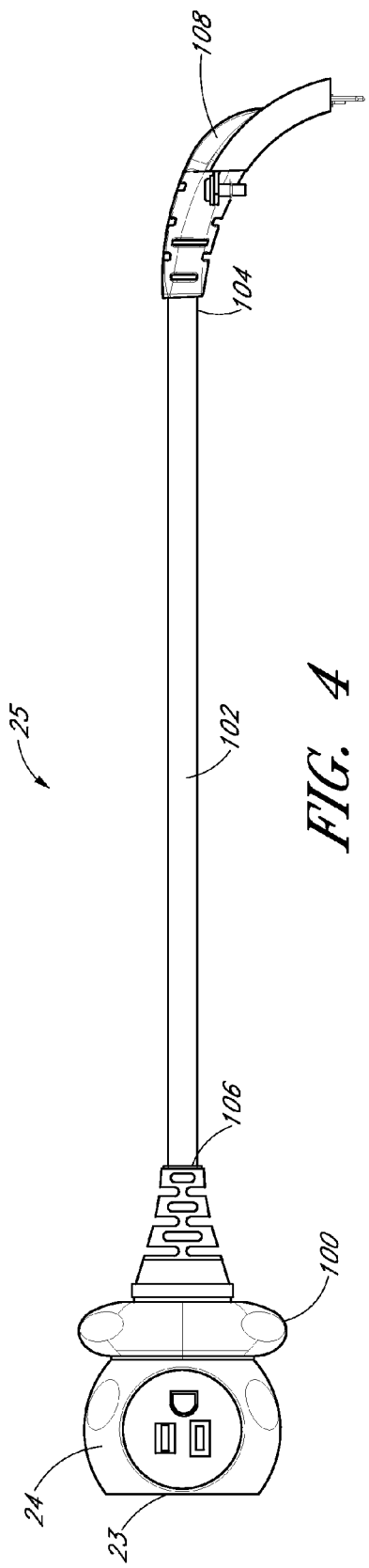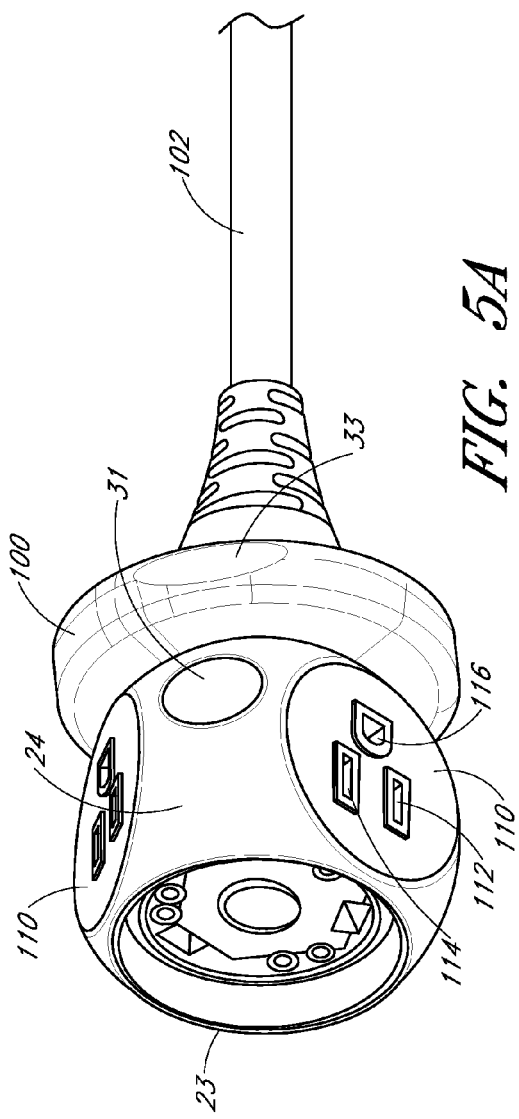
FIG. 4
FIG. 5A

ELECTRICAL CORD WITH WEAR RING

INCORPORATION BY REFERENCE

The present application claims priority to U.S. Provisional Patent Application No. 61/582,141 filed on Dec. 30, 2011 and entitled "Electrical Cord With Removable Wear Ring," the entire contents of which are incorporated herein by reference and should be considered a part of this specification. The present application incorporates by reference the entire disclosures of U.S. Pat. No. 7,320,843 to Harrington; U.S Pat. No. 7,350,736 to Caamano et al.; U.S. Pat. No. 7,419,038 to Caamano et al.; U.S Pat. No. 7,503,338 to Harrington et al.; and U.S. Pat. No. 7,533,843 to Caamano et al.; U.S. Patent Application Publication No. US2008/0223951A1 to Tracey et al.; U.S. patent application Ser. No. 13/216,673 filed Aug. 24, 2011 to Tracey; and U.S. Provisional Patent Application Nos. 61/515,727 filed Aug. 5, 2011 to Tracey et al. and 61/515,799 filed Aug. 5, 2011 to Tracey et al.

BACKGROUND

1. Field

The present application relates generally to electrical cords, and specifically to electrical plug receptacles of cords (especially cords used in cord reels).

2. Description of the Related Art

Electrical cords, such as extension cords, have included end receptacles for receiving one or more electrical plugs for providing electrical power from the cord to the plugs.

Motorized electrical cord reels allow a user to automate the winding and unwinding of electrical cord from the reel.

SUMMARY

In one aspect, the present disclosure provides an electrical cord comprising a cord segment having at least one wire, an electrical plug receptacle connected to an end of the cord segment, and a wear ring engaged with and surrounding the receptacle. The receptacle includes one or more apertures configured to receive at least one electrical plug to form an electrical connection between the plug and the at least one wire. The wear ring is sized and configured to substantially prevent surfaces of the receptacle adjacent to the one or more apertures from contacting a ground surface when the end of the cord segment is dragged along the ground surface. The wear ring can comprise a plurality of wear ring portions adapted to be assembled together around the receptacle. The wear ring can be removable from the receptacle by disassembling the wear ring portions.

In another aspect, the present disclosure provides an electrical cord reel comprising a spool member rotatable about a winding axis, and an electrical cord. The electrical cord comprises a cord segment having a plurality of wires, a connector at a first end of the cord segment, an electrical plug receptacle connected to a second end of the cord segment, and a wear ring engaged with and surrounding the receptacle. The receptacle includes one or more apertures configured to receive at least one electrical plug to form an electrical connection between the plug and one or more of the wires. The wear ring is sized and configured to substantially prevent surfaces of the receptacle adjacent to the one or more apertures from contacting a ground surface when the end of the cord segment is dragged along the ground surface. The wear ring can comprise a plurality of wear ring portions adapted to be assembled together around the receptacle. The wear ring can be removable from the receptacle by disassembling the wear ring portions. The connector is connected to the spool member. The reel is configured to convey electrical power to the connector. The cord is configured to become spooled onto the spool member when the spool member rotates in a first direction about the winding axis. The cord is configured to become unspooled from the spool member when the spool member rotates in a second direction about the winding axis, the second direction being opposite the first direction.

An electrical cord assembly disclosed herein comprises a cord segment having one or more wires. The electrical cord assembly further comprises an electrical plug receptacle connected to an end of the cord segment, the receptacle including one or more apertures configured to receive an electrical plug to form an electrical connection between the plug and the one or more wires. The electrical cord assembly further comprises a wear ring configured to engage and surround at least a portion of the receptacle. The wear ring is sized and configured to inhibit at least a portion of a surface of the receptacle adjacent to the one or more apertures from contacting a ground surface when the end of the cord segment is on the ground surface. The wear ring can comprise a plurality of wear ring portions configured to be assembled together to releasably engage and surround the portion of the receptacle. The wear ring can be removable from the electrical cord by disassembling the wear ring portions.

In some embodiments, a substantial entirety of the surface is prevented from contacting the ground surface when the wear ring is on the receptacle and when the end of the cord segment is dragged along the ground surface; a transverse cross-section of the wear ring is at least as large as a transverse cross-section of the receptacle; a transverse cross-section of the wear ring is larger than a transverse cross-section of the receptacle; a transverse cross-section of the wear ring is substantially at least one of circular or triangular; the surface of the receptacle adjacent to the one or more apertures is flat, the wear ring being sized and configured to substantially prevent the flat surface from contacting a ground surface when the wear ring is on the receptacle and when the end of the cord segment is on the ground surface; the receptacle includes a plurality of surfaces, each surface containing one or more apertures, the wear ring being sized and configured to substantially prevent each of the surfaces from contacting the ground surface when the wear ring is on the receptacle and when the end of the cord segment is on the ground surface; the one or more wires comprises a ground wire, a hot wire, and a neutral wire; the wear ring is configured to engage with the receptacle in a manner in which the wear ring is not movable with respect to the receptacle; the wear ring includes one or more anti-movement features configured to engage anti-movement features of the receptacle, to prevent movement of the wear ring with respect to the receptacle; the wear ring comprises glass-filled nylon; the wear ring comprises two wear ring portions; at least one of the wear ring portions can surround at least 180 degrees of a transverse cross-section of the receptacle when the wear ring is on the receptacle; and/or the wear ring portions are configured to be secured with one or more screws.

An electrical cord disclosed herein comprises a cord segment comprising a wire. The electrical cord further comprises a receptacle on an end of the cord segment, the receptacle comprising a connection surface including an aperture, the connection surface configured to receive an adapter to form an electrical connection between the adapter and the wire via the aperture. The electrical cord further comprises a wear member on the receptacle, the wear member configured to inhibit at least a portion of the connection surface from contacting a ground surface when the receptacle is on the ground surface.

In some embodiments, the wire includes a plurality of wires and the aperture includes a plurality of apertures; the connection surface includes a plurality of connection surfaces configured to receive a plurality of adapters; the connection surface is a flat surface; a cross-section of the wear member is at least as large as a cross-section of the receptacle, the cross-sections parallel to each other and substantially perpendicular to a central axis along the cord segment when the cord segment is arranged to be straight; the cross-section of the wear member is larger than the cross-section of the receptacle; the connection surface comprises a flat surface; the cross-sections of the wear member and the receptacle are substantially perpendicular to the flat surface of the connection surface; the wear member forms a band around a portion of the receptacle; the wear member is substantially at least one of a circular shape or a triangular shape; the wear member comprises a cutout configured to provide a preferential orientation of the receptacle relative to the ground surface when the receptacle is on the ground surface; the cutout is circumferentially misaligned with the connection surface of the receptacle; the wear member comprises a plurality of portions; each of the plurality of portions is engaged with at least one other portion; the wear member is fixed relative to the receptacle; the wear member comprises a protrusion engaging a protrusion of the receptacle to fix the wear member in a predetermined position relative to the receptacle; and/or the protrusion of the wear member engages the protrusion of the receptacle to fix the wear member in the predetermined position relative to the receptacle when the wear member is rotated relative to the receptacle about a central axis along the cord segment when the cord segment is arranged to be straight.

An electrical cord reel disclosed herein comprises a spool member rotatable about a winding axis. The electrical cord reel further comprises an electrical cord. The electrical cord further comprises a cord segment having a plurality of wires. The electrical cord further comprises a connector at a first end of the cord segment. The electrical cord further comprises an electrical plug receptacle connected to a second end of the cord segment, the receptacle including one or more apertures configured to receive at least one electrical plug to form an electrical connection between the plug and one or more of the wires. The electrical cord further comprises a wear ring engaged with and surrounding the receptacle. The wear ring is sized and configured to substantially prevent surfaces of the receptacle adjacent to the one or more apertures from contacting a ground surface when the end of the cord segment is dragged along the ground surface. The wear ring can comprise a plurality of wear ring portions configured to be assembled together to engage and surround the receptacle. The wear ring can be removable from the electrical cord by disassembling the wear ring portions. The connector is connected to the spool member. The reel is configured to convey electrical power to the connector. The electrical cord is configured to become spooled onto the spool member when the spool member rotates in a first direction about the winding axis. The electrical cord is configured to become unspooled from the spool member when the spool member rotates in a second direction about the winding axis, the second direction being opposite the first direction. In some embodiments, a transverse cross-section of the wear ring is at least as large as a transverse cross-section of the receptacle.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

All of these embodiments are intended to be within the scope of the invention herein disclosed. These and other embodiments will become readily apparent to those skilled in the art from the following detailed description of the some embodiments having reference to the attached figures, the invention not being limited to any particular embodiment(s) disclosed.

BRIEF DESCRIPTION OF THE DRAWINGS

FIG. 4 is a side view of an embodiment of an electrical cord having a wear ring.

FIG. 5A is perspective view of an embodiment of a distal end of an electrical cord.

DETAILED DESCRIPTION

Figure 1:
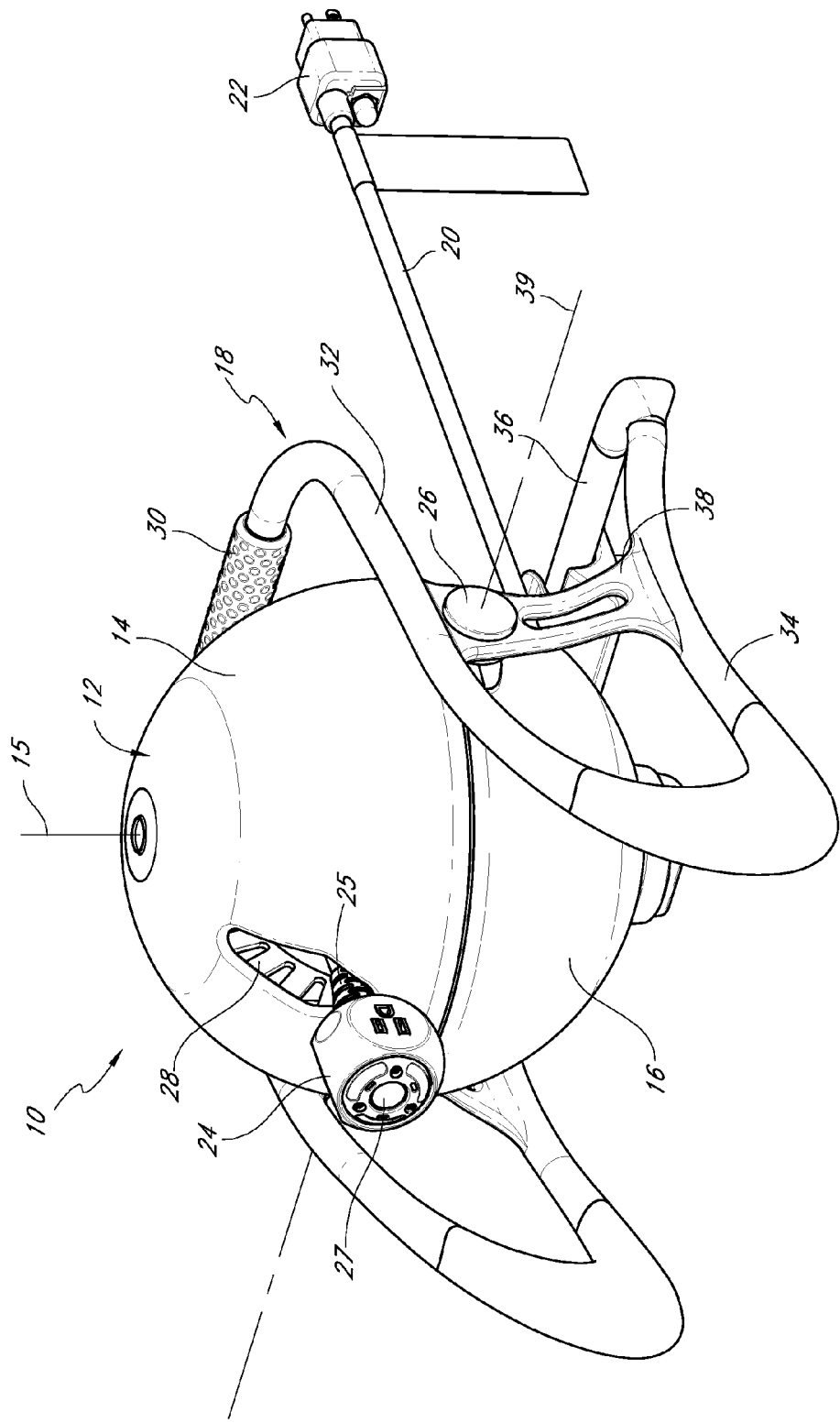
FIG. 1 is a perspective view of an embodiment of an electrical cord reel.

FIG. 1 is a perspective view of an embodiment of an electrical cord reel 10. The reel 10 includes a housing 12 that substantially encloses various reel components. In the illustrated embodiment, the housing 12 is substantially spherical, but it will be understood that the housing can have other shapes. The illustrated housing 12 comprises an upper portion 14 and a lower portion 16, but it will be appreciated that the housing 12 can comprise more than two major portions. In the illustrated embodiment, each portion 14 and 16 is substantially semispherical. In some embodiments, the housing portions 14 and 16 can rotate with respect to each other about a housing axis 15. Further details of embodiments of the housing 12, including structure to facilitate relative rotation between portions 14 and 16 about axis 15, are disclosed in U.S. Pat. No. 7,533,843 to Caamano et al.

The reel 10 can include a support structure for supporting the reel with respect to a support surface, such as the ground, a tabletop, or even a wall or ceiling. A mounting element can be provided to secure the support structure with respect to a vertical wall or a ceiling. Examples of support structures and a compatible mounting element for mounting the reel to a wall or ceiling are provided in U.S. Pat. No. 7,419,038 to Caamano et al. and U.S. Patent Application No. 61/515,799 filed Aug. 5, 2011.

The illustrated reel 10 has a support structure 18 comprising a rear handle portion 30, a pair of side arm portions 32, a pair of side foot portions 34, and a rear foot portion 36. The side arm portions 32 and side foot portions 34 can be positioned on opposing sides of the housing 12. The rear handle portion 30 may include a grip cover (e.g., formed of rubber) to make it easier to grip the portion 30. The transitions between the arm portions 32 and the foot portions 34 and/or the transitions between the side foot portions 34 and the rear foot portion 36 can be enclosed within tubular covers (e.g., rubber covers) to reduce how much the support structure 18 gets scratched and scratches other surfaces, as well as to reduce the tendency of the reel 10 to slide upon a support surface. The support structure 12 can further include connections 38 between the side arm portions 32 and the side foot portions 34, to further rigidify the support structure 18. In some embodiments, the housing 12 is rotatably mounted to the support structure 18 at a pair of connections 26 on opposing sides of the housing, so that the housing 12 is configured to rotate at least partially with respect to the support structure 18 about a substantially horizontal axis 39 extending through connections 26.

The reel 10 can include an input electrical power cord 20 with an input power connector 22 (illustrated as a standard electrical plug) configured to be mechanically and electrically coupled to an electrical power source 50 (FIG. 3), such as a standard electrical outlet. It will be appreciated that the input power connector 22 need not be provided on an input cord 20. For example, the electrical power source 50 can comprise a battery or battery pack, and the input power connector 22 can comprise terminals for connection thereto. In such embodiments, the battery or battery pack may be enclosed within the housing 12. A suitable battery structure is disclosed in U.S. Pat. No. 7,320,843 to Harrington. It will be appreciated that the reel 10 can include a first input power connector for connecting to a battery, and/or a second input power connector 22 of an electrical cord 20.

Figure 5B:
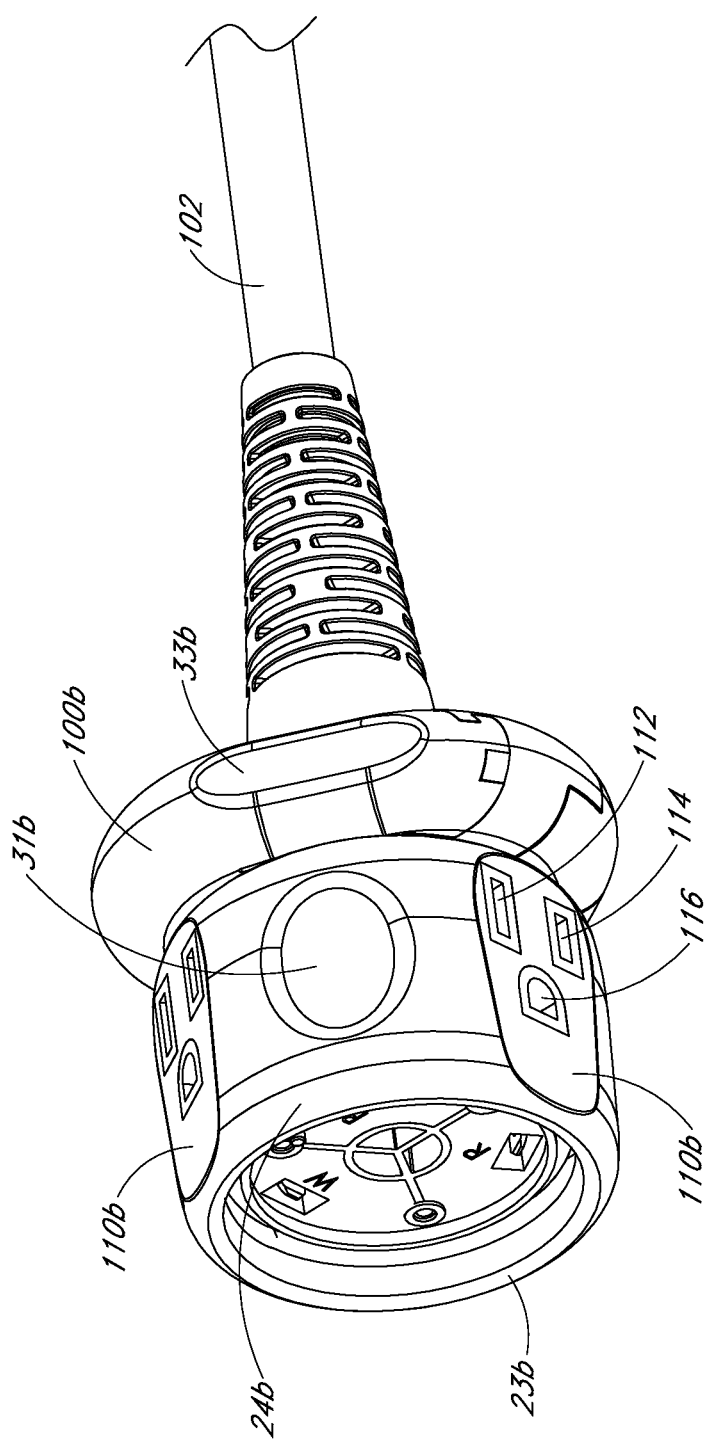
FIG. 5B is perspective view of another embodiment of a distal end of an electrical cord.
Figure 6:
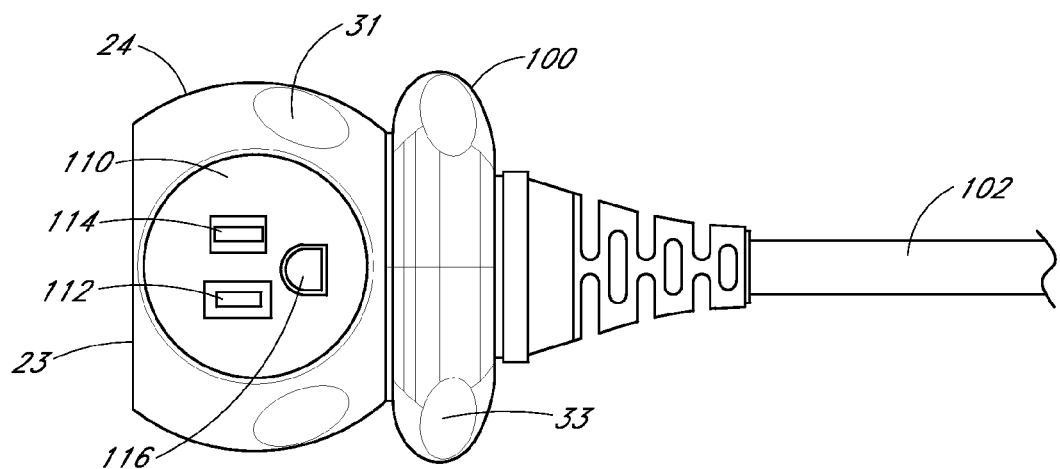
FIG. 6 is a side view of an embodiment of an electrical cord.
Figure 7A:
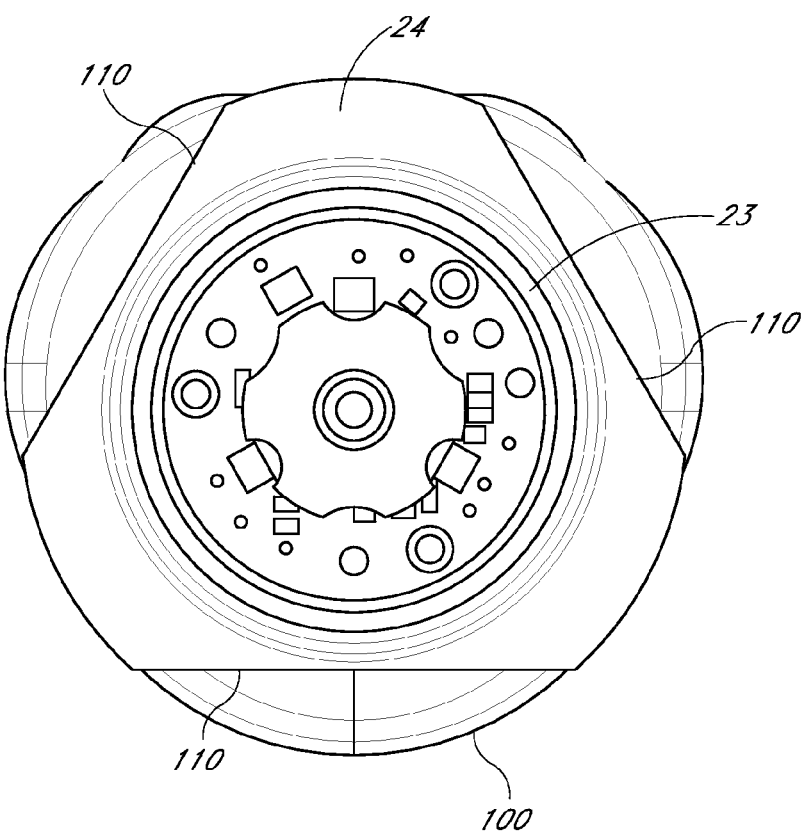
FIG. 7A is a front view of an embodiment of an electrical cord.
Figure 7B:
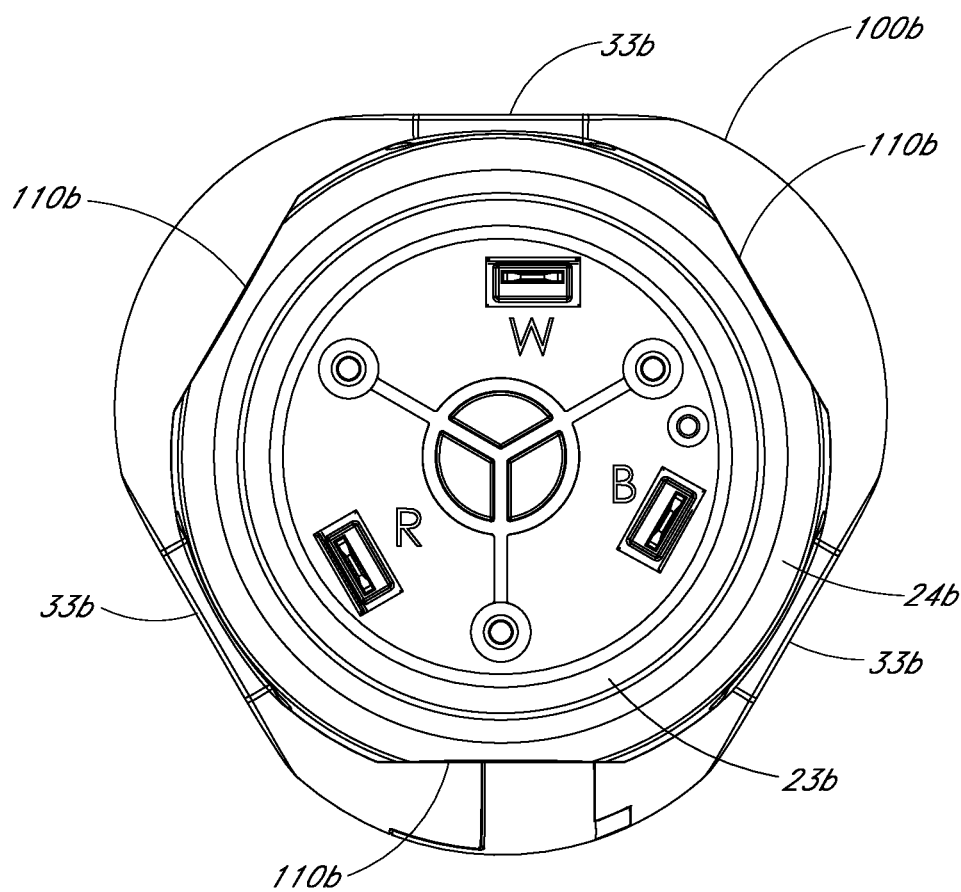
FIG. 7B is a front view of another embodiment of an electrical cord.

The reel 10 can be configured to spool an output electrical cord 25 (FIGS. 3-7, including FIG. 7B). As discussed herein, the reel 10 is configured to convey electrical current from the input power connector 22 to the output cord 25. The output cord 25 can include an electrical plug receptacle 24 with one or more terminals for mechanically and electrically coupling to power cords of devices that receive electrical power from the cord 25. Each such terminal can include a plurality of apertures for receiving prongs of an electrical plug, such as a hot wire prong, a neutral wire prong, and a ground prong, as known in the art. While each terminal of the illustrated electrical plug receptacle 24 includes three prongs for receiving a standard three-prong electrical plug for electrical power conveyance, in other embodiments a terminal of the receptacle 24 can include fewer apertures (e.g., one or two apertures) for receiving one or more prongs for other purposes (e.g., electrical signal transmissions).

The housing 12 can include an aperture 28 through which the cord 25 may extend when partially wound about a spool member 40 (FIG. 2, described below) within the housing 12. In the illustrated embodiment, the aperture 28 is formed within the upper housing portion 14.

Figure 2:
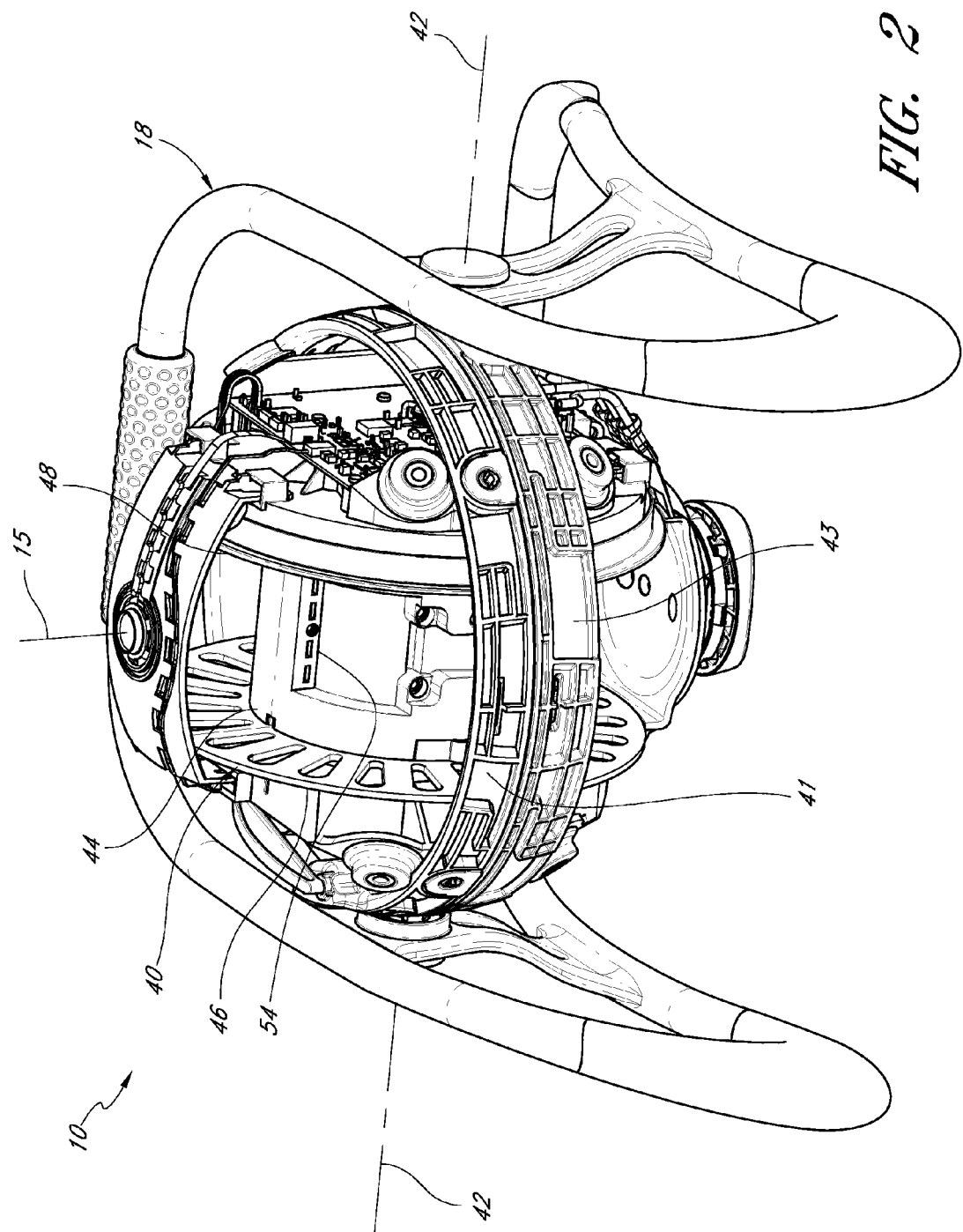
FIG. 2 is a perspective view of an embodiment of an electrical cord reel showing internal components.

FIG. 2 shows the cord reel 10 with the upper housing portion 14 and lower housing portion 16 removed to reveal interior components. The illustrated reel 10 can include an upper circular rail 41 that attaches to the lower portion of the upper housing portion 14 and/or a lower circular rail 43 that attaches to the upper portion of the lower housing portion 16. The upper rail 41 and lower rail 43 (and their respective housing portions) can rotate with respect to one another about the housing axis 15, by employing, for example, wheels, ball bearings, and/or other elements to facilitate such rotation.

The housing 12 (FIG. 1) can substantially enclose a spool member 40 configured to rotate about a winding axis 42 to spool and unspool an electrical cord 25 (or other flexible linear materials) about the spool member 40. The cord 25 can be configured to become spooled onto the spool member 40 when the spool member 40 rotates in a first direction about the winding axis 42, and to become unspooled from the spool member 40 when the spool member 40 rotates in a second direction about the winding axis 42, the second direction being opposite the first direction. The housing 12 can enclose the spool member 40, an output power connector 54, and/or a motor 78. The winding axis 42 can be collinear or parallel to the horizontal axis 39 (FIG. 1). In some embodiments, the spool member 40 and its winding axis 42 can rotate about the housing axis 15 relative to the support structure 18 and lower housing portion 16. In the illustrated embodiment, the spool member 40 comprises a generally cylindrical drum 44 and a pair of circular plates 46 and 48 sandwiching the drum 44. It will be appreciated that the drum 44 need not be cylindrical.

In some embodiments, the reel 10 includes a reciprocating mechanism that causes the spool member 40 to rotate back and forth in a reciprocating fashion about the housing axis 15 (regardless of whether the housing portions 14 and 16 are configured to rotate with respect to one another about the axis 15) with respect to the portion of the housing 12 having the aperture 28 (in the illustrated embodiment, the upper housing portion 14). The reciprocating mechanism can promote more uniform winding of the cord 25 onto the spool member 40. The reciprocating mechanism can produce a reciprocating rotation of the spool member 40 about the axis 15 while the spool member 40 is rotating about the winding axis 42. An exemplary reciprocating mechanism is disclosed in U.S. Pat. No. 7,533,843 to Caamano et al.

Figure 3:
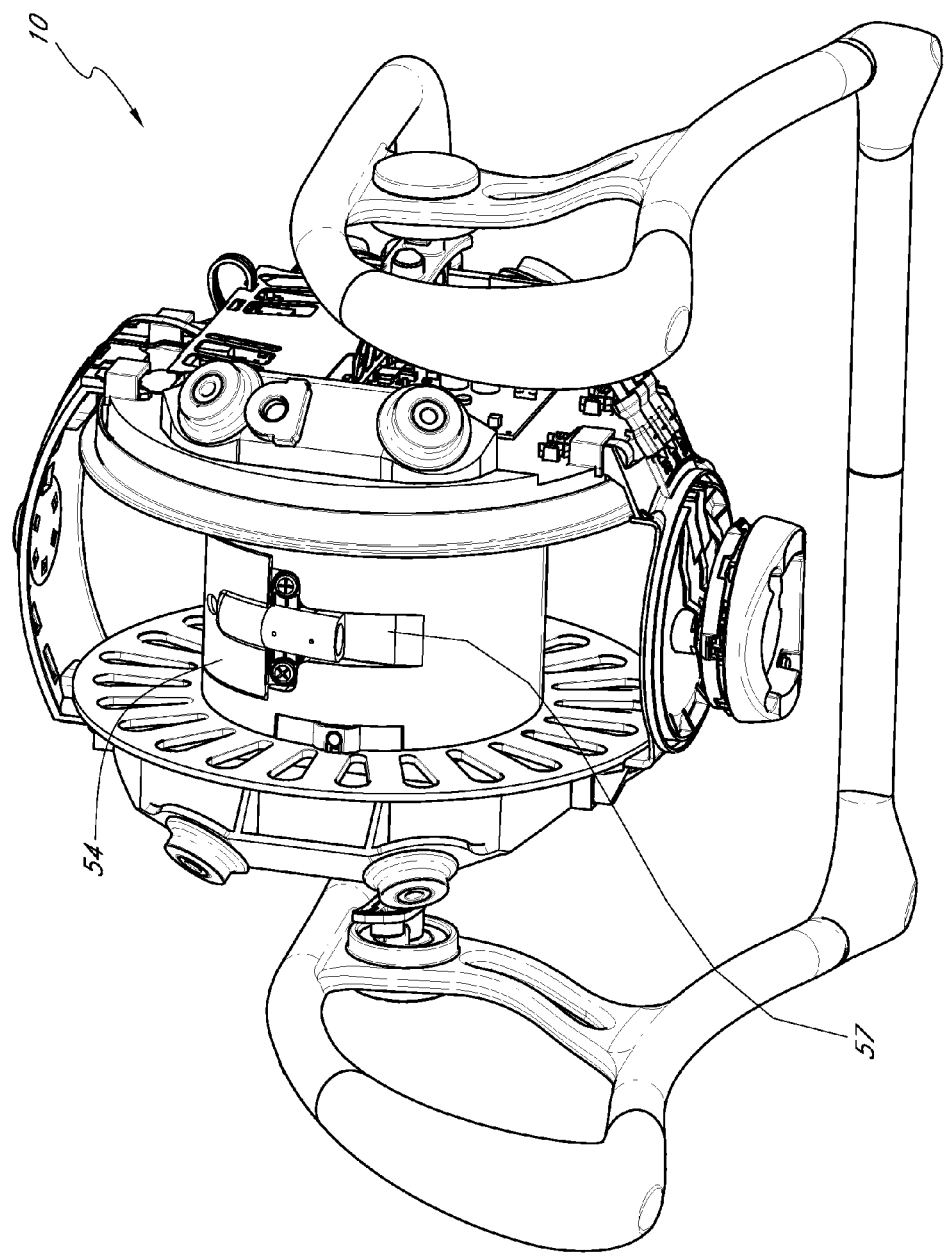
FIG. 3 is a perspective view of an embodiment of an electrical cord reel showing internal components.

Referring to FIGS. 2 and 3, the output power connector 54 can be on the spool member 40. The output power connector 54 can be configured to be mechanically and electrically coupled to the output electrical cord 25. The reel 10 can be configured to convey electrical current from the input power connector 22 (FIG. 1) to the output power connector 54. The power connector 54 can include a terminal for electrical connection with the output cord 25. In some embodiments, a recess (e.g., a sloped or ramped recess) 57 can be provided to accommodate a terminal portion of the output cord 25, so as to reduce an extent to which the connection of the cord 25 and the output power connector 54 produces a variation in the profile of the surface onto which the cord is spooled.

FIG. 4 is a side view of an embodiment of an electrical cord 25 having a wear ring 100. The cord 25 can include a cord segment 102 having a first end 104 and a second 106. While the length of the cord segment 102 in FIG. 4 is illustrated to be relatively short, skilled artisans will understand that such length can be much longer in practice, such as 25-150 feet.

The cord segment 102 can include at least one wire, including a plurality of wires. In some embodiments, the cord segment 102 of a power or electrical cord 25 can include at least a hot wire, a neutral wire, and a ground wire, as known in the art. One or more additional wires can also be provided, such as signal wires as disclosed in U.S. Provisional Patent Application No. 61/515,727 filed Aug. 5, 2011. In some embodiments, the cord segment 102 can comprise insulation that prevents the wires from making undesirable electrical contact with exterior surfaces, as known in the art. For example, FIG.

9 shows a cross-section of an embodiment of a cord segment 102 comprising a hot wire 140, neutral wire 142, ground wire 144, and signal wire 146 within insulation 148.

With continued reference to FIG. 4, a connector 108 can be connected to the first end 104 of the cord segment 102. The connector 108 is can be configured to be connected to the spool member 40, so that the reel 10 can convey electrical power to the connector 108. In the illustrated embodiment, the connector 108 can be removably electrically connected to the output power connector 54 of the spool member 40, such that the output power connector 54 can convey electrical power to the wires of the cord segment 102 via the connector 108.

The electrical plug receptacle 24 can be connected to the second end 106 of the cord segment 102. With reference to FIGS. 5-7, the electrical plug receptacle 24 can include one or more apertures configured to receive at least one electrical plug (not shown) to form an electrical connection between the plug and one or more of the wires of the cord segment 102. The receptacle 24 can include at least one substantially flat surface 110 containing one or more of the apertures, and the apertures can comprise a neutral prong aperture 112, a "hot" prong aperture 114, and a ground aperture 116, as known in the art. It will be appreciated that the receptacle 24 can include a plurality of such substantially flat surfaces 110, wherein each surface 110 contains one or more of the apertures. In the illustrated embodiment shown in FIGS. 5A and 7A, the receptacle 24 can include three substantially flat surfaces 110 spaced apart at 120° angles about the perimeter of the receptacle 24, each surface 110 including a neutral prong aperture 112, a hot prong aperture 114, and a ground aperture 116. The periphery and/or circumference of the flat surfaces 110 can be substantially round in shape such as, for example, when the receptacle 24 is generally round in shape. In the illustrated embodiment shown in FIGS. 5B and 7B, the periphery and/or circumference of the flat surfaces 110b can be substantially oval or any other elongated shape when the receptacle 24b is elongated. In some embodiments, the periphery and/or circumference of the flat surfaces 110b can generally match a shape of a plug being plugged into the receptacle 24b. The receptacle 24, 24b can have a generally cylindrical shape. In some embodiments, the receptacle 24, 24b can be generally conical or frustum shaped.

In some embodiments, the electrical plug can have indentations or grooves 31, 31b on the receptacle 24, 24b. The grooves 31, 31b can provide a user with a place to grip onto the receptacle 24, 24b when plugging and unplugging a plug into the receptacle 24, 24b.

Figure 8A:
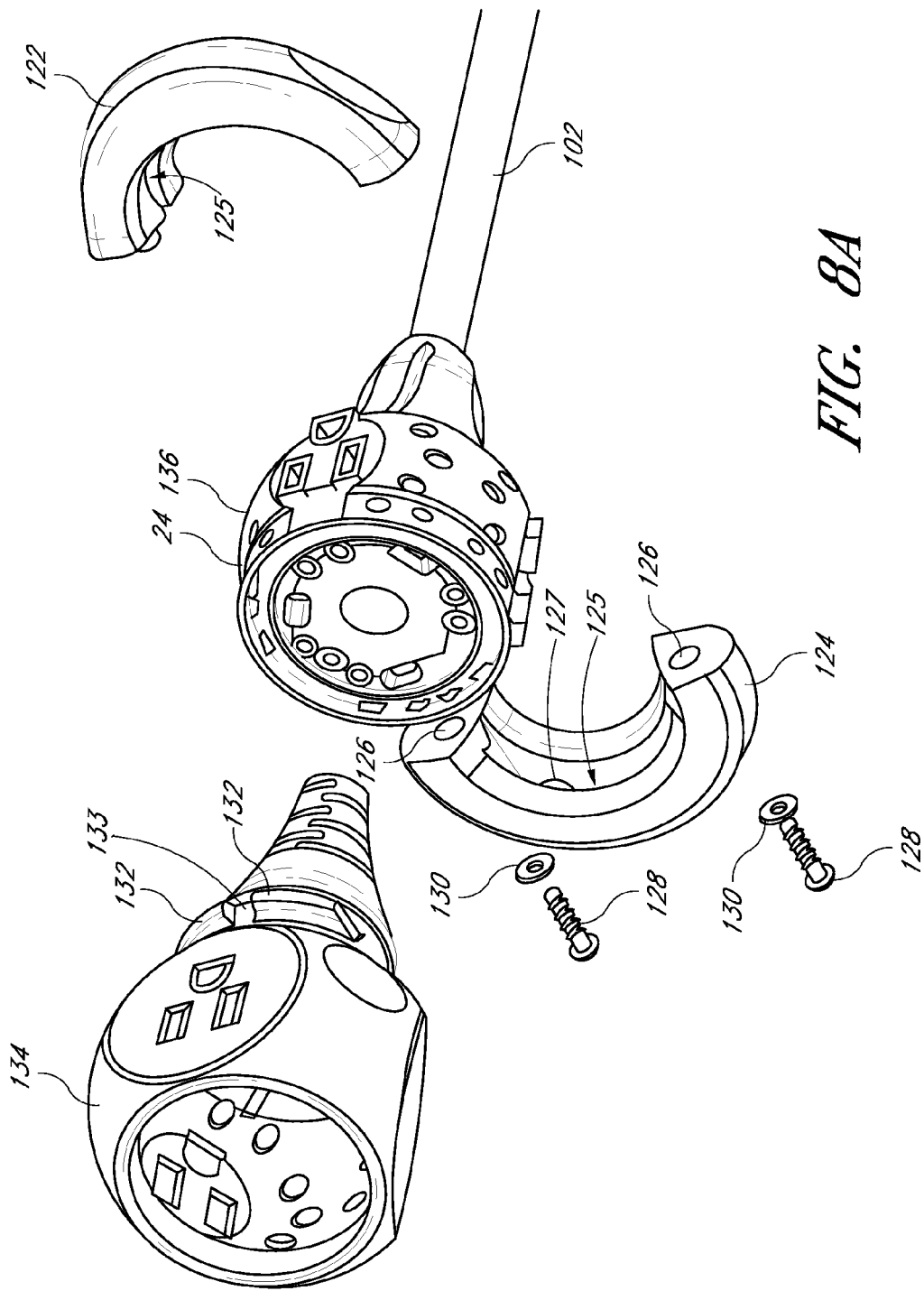
FIG. 8A is a perspective view of an embodiment of an electrical cord with a wear ring disassembled.
Figure 8B:
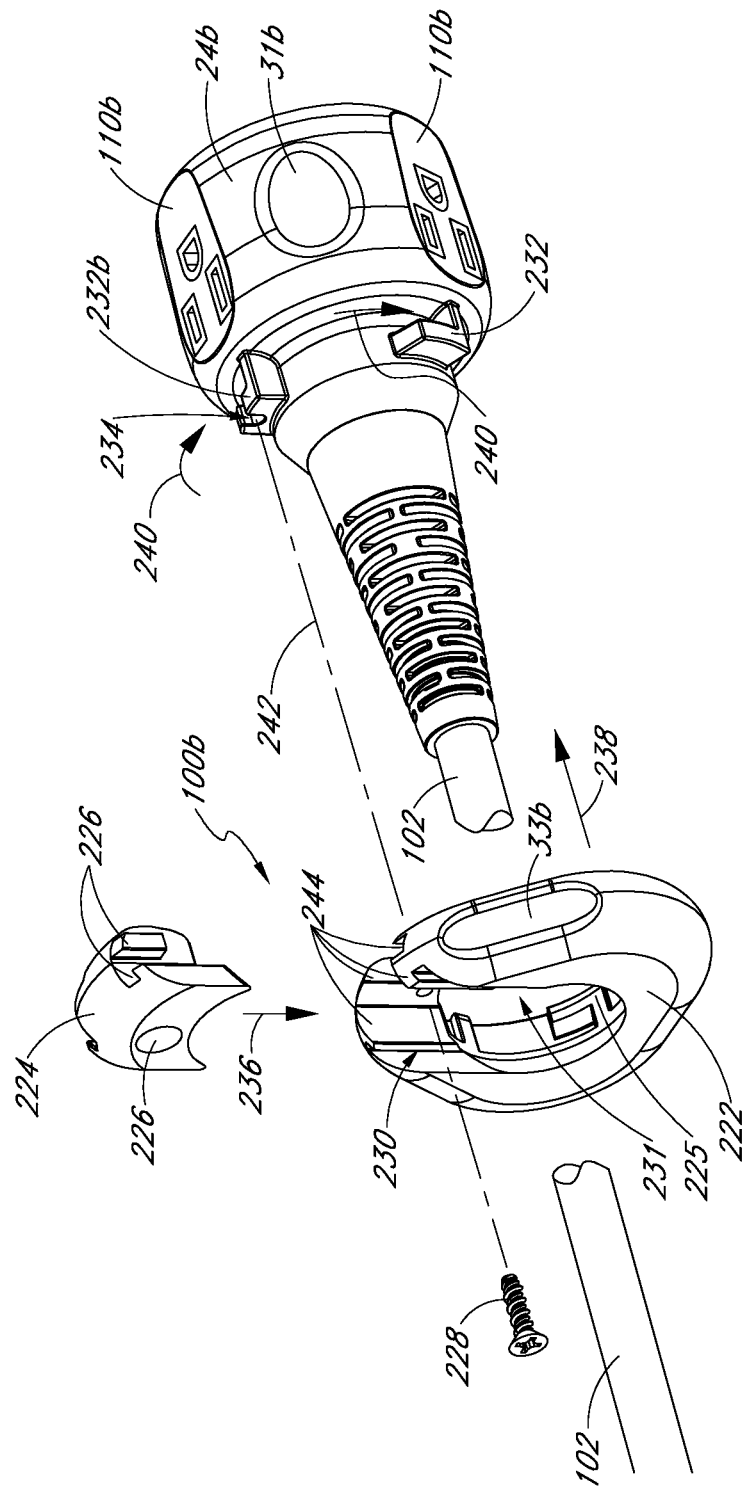
FIG. 8B is a perspective view of another embodiment of an electrical cord with a wear ring disassembled.
Figure 9:
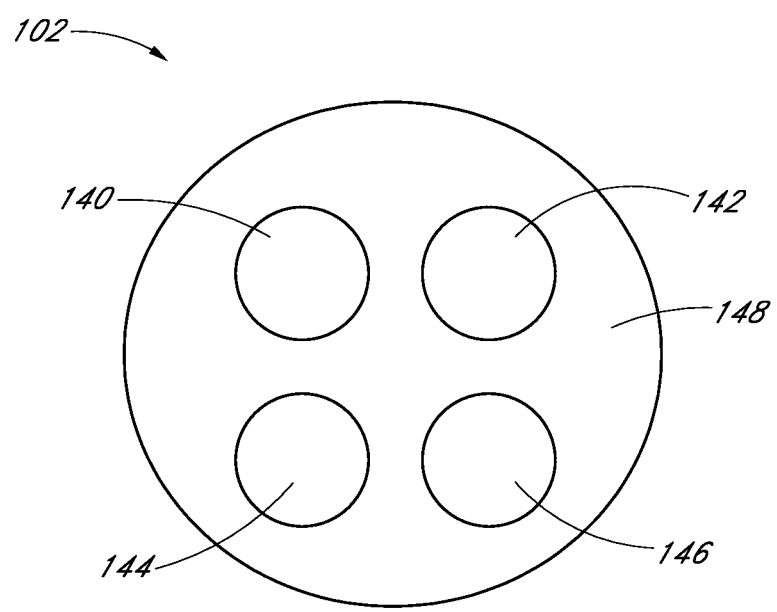
FIG. 9 shows is a transverse cross-sectional view of an embodiment of an electrical cord segment.

As discussed herein, features of the embodiment of the receptacle 24 illustrated in FIGS. 4, 5A, 6, 7A, and 8A can be utilized with the features of the embodiment of the receptacle 24b illustrated in FIGS. 5B, 7B, and 8B. Thus, while some features and functions are discussed in the context of the embodiment of the receptacle 24 illustrated in FIGS. 4, 5A, 6, 7A, and 8A, and some features and functions are discussed in the context of the embodiment of the receptacle 24b illustrated in FIGS. 5B, 7B and 8B, the features or functions can be applied to both illustrated embodiments regardless of reference number designation. For example, regardless of whether the term "flat surfaces 110", "flat surfaces 110b", or "flat surfaces 110, 110b" is used, the feature being discussed can be applied to any embodiment discussed herein.

With reference to FIG. 1, the receptacle 24 can include a button or other type of user interface element 27 that a user can activate to control electrical power delivery or electronic signaling through the cord 25. Embodiments and further details of such control are disclosed in U.S. Provisional Patent Application No. 61/515,727 filed Aug. 5, 2011.

Referring to FIGS. 4-7, the wear ring 100 can engage with and surround at least a portion of the electrical plug receptacle 24. In certain embodiments, the wear ring 100 is sized and configured to substantially prevent surfaces of the receptacle 24 adjacent to the receptacle's apertures (in the illustrated embodiment, portions of the flat surfaces 110 containing the apertures 112, 114, and 116) from contacting a ground surface when the second end 106 of the cord segment 102 is dragged along the ground surface. As used herein, a "ground surface" can refer to any surface along which the cord can rest or be pulled on, such as, for example, the ground, a work bench, a vertical wall, etc. In some embodiments, the wear ring 100 is sized and configured to substantially prevent one or more of the flat surfaces 110 of the receptacle 24 (e.g., each of the flat surfaces 110) from contacting the ground surface as the second end 106 of the cord segment 102 is in contact with the ground surface and/or is dragged along the ground surface.

In some embodiments, the wear ring 100, 100b is sized and configured to substantially prevent at least a portion of each flat surface 110, 110b from contacting the ground surface when the receptacle 24, 24b is on the ground surface. For example, the wear ring 100, 100b can be sized and configured such that when the receptacle 24, 24b contacts a ground surface, any flat surface 110, 110b facing the ground surface contacts the ground surface at a portion near a receptacle end 23, 23b while the remaining portion of the receptacle 24, 24b does not contact the ground. Accordingly, the wear ring 100, 100b can help prevent each surface 110, 110b from becoming worn or damaged over time or after significant use of the reel 10.

In the illustrated embodiment, as best seen in FIG. 7A, a transverse cross-section (i.e., in FIG. 4, a cross-section perpendicular to the orientation of the cord segment 102 and also perpendicular to the plane of the drawing) of the wear ring 100 is at least as large and/or is generally the same size as a transverse cross-section of the receptacle 24. In some embodiments, the cross-section of the wear ring 100 has a same dimension (perpendicular to the orientation of the cord segment 102 in FIG. 4) as a dimension of the cross-section of the receptacle 24. The dimension can be, for example, a radius, a diameter, a chord, and/or another diagonal dimension of a cross-section. As illustrated in the front view of FIG. 7A, at least a portion of the perimeters or circumferences of the wear ring 100 and the receptacle 24 can be coincident when viewed from the front.

As illustrated in FIG. 7B, in some embodiments, a transverse cross-section of a wear ring 100b is larger than a transverse cross-section of the receptacle 24b. The periphery and/or circumference of the wear ring 100b can be larger in any dimension when viewed from the front. In some embodiments, the transverse cross-section of the wear ring 100 is smaller than the transverse cross-section of the receptacle 24. For example, a portion of the periphery and/or circumference of the wear ring 100, 100b can be smaller than a portion of the perimeter of the receptacle 24b when viewed from the front.

In the illustrated embodiment of FIG. 7A, the transverse cross-section of the wear ring 100 is substantially circular. However, it will be understood that the transverse cross-section of the wear ring 100 can have non-circular shapes. For example, in the illustrated embodiment of FIG. 7B, the transverse cross-section of the wear ring 100b is generally triangular. The triangular wear ring 100b can have rounded corners. The rounded corners can line up, coincide, or circumferentially align with the flat surfaces 110b to provide a greater distance or clearance between the flat surfaces 110*b* and a ground surface when on the ground surface. In some embodiments, the wear ring 100*b* can be oval, square, other round or polygonal shapes, and combination thereof to prevent at least a portion of the flat surfaces 110*b* from contacting the ground surface when on the ground surface and/or to provide a preferential orientation of receptacle 24*b* when on the ground surface such that the flat surfaces 110*b* do not face the ground surface.

In some embodiments, the wear ring 110, 110*b* can have depressions or cutouts 33, 33*b*. The cutouts 33, 33*b* on the wear ring 100 can provide a preferential orientation of receptacle 24, 24*b* when on the ground surface. The cutouts 33, 33*b* can also reduce the transverse cross-sectional area of the wear ring 100*b* as illustrated in FIG. 7B to provide a more compact design while still preventing at least a portion of the flat surfaces 110*b* from contacting the ground surface. The reduced transverse cross-sectional area of a wear ring 100*b* is illustrated in FIG. 7B.

The cutouts 33, 33*b* can substantially line up, coincide, or circumferentially align with the grooves 31, 31*b* when viewed from a front view of FIGS. 7A and 7B. The cutouts 33, 33*b* can be circumferentially oriented to be misaligned with the flat surfaces 110, 100*b* along the transverse cross-sections of the wear ring 100, 100*b* and the receptacle 24, 24*b*. The misalignment can provide a preferential orientation of the receptacle 24, 24*b* on the ground such that the flat surfaces 110, 110*b* do not face the ground surface. The misalignment can provide a preferential orientation of the receptacle 24, 24*b* such that a surface of the receptacle 24, 24*b* other than the flat surfaces 110, 110*b* for example the surface having the grooves 31, 31*b*, is in contact with the ground surface when the receptacle 24, 24*b* is on the ground surface.

In some embodiments, the wear ring 100, 100*b* can be integrally formed with the receptacle 24, 24*b*. In some embodiments, as illustrated in FIGS. 8A-8B, the wear ring 100 can comprise a plurality of wear ring portions adapted to be assembled together around the electrical plug receptacle 24. This allows the wear ring 100 to be removable from the receptacle 24 by disassembling the wear ring portions from each other. In some embodiments, each of the wear ring portions extends through a portion of a total receptacle-encircling length of the wear ring 100 when assembled. For example, FIG. 8A shows an embodiment in which the wear ring 100 comprises two wear ring portions 122 and 124, each of which is substantially C-shaped and extends approximately 180° of the total receptacle-encircling length of the wear ring 100.

The plurality of wear ring portions can be configured to be coupled together in any of a variety of methods, with consideration given to the goal of providing a wear ring 100 that is removable from the electrical plug receptacle 24. For instance, the wear ring portions can be assembled together with screws, facilitating the disassembly and removability of the wear ring 100 from the receptacle 24. In some embodiments, the wear ring portions 122, 124 can be joined with any suitable mechanism that can hold the portions 122, 124 together, such as, for example, interference fit mechanisms, snap fit mechanisms, and so forth, which can include using male and female mating parts. In the illustrated embodiment, the wear ring portion 124 includes a pair of screw holes 126 that receive screws 128 and optionally washers 130. The screws 128 can extend through the screw holes 126 into corresponding screw holes (not shown) of the wear ring portion 122, to couple the two wear ring portions together, as will be understood by persons of ordinary skill in the art. The unshown screw holes of the wear ring portion 122 can be threaded secure the screws 128 therein.

The wear ring 100 can be formed of one or more materials that are sufficiently resistant to wear caused by dragging the wear ring 100 along a ground surface. Persons of ordinary skill in the art will appreciate that the wear ring portions of the wear ring 100 can be formed of any of a large variety of materials. In some embodiments, the wear ring portions 122, 124 of the wear ring 100 are formed of glass-filled nylon. In some embodiments, the wear ring 100 can be made of any suitable polymer, which can be reinforced with other materials, including fiberglass, metal, carbon fiber, and/or the like. In some embodiments, the wear ring 100 can be made of a hard plastic, metal or other suitable wear resistant material.

The wear ring 100 can be engaged with the electrical plug receptacle 24 in a manner in which the wear ring 100 is not movable with respect to the receptacle 24. For example, the wear ring 100 can include one or more anti-movement features that engage corresponding anti-movement features of the receptacle 24, to prevent movement of the wear ring 100 with respect to the receptacle 24. An anti-movement feature can be male (e.g., projections, splines, etc.) or female (e.g., recesses, grooves, trenches, etc.), and a male anti-movement feature can engage with a female anti-movement feature to prevent relative movement therebetween. In some embodiments, a radially inner surface 125 of the wear ring 100 includes one or more anti-movement features that engage one or more corresponding anti-movement features on the outer surface of the receptacle 24. In the embodiment shown in FIG. 8A, the proximal end of the receptacle 24 includes one or more ribs or splines 132. The ribs or splines 132 can be spaced from each other or have a cutout to form a slot 133. The inner surface of the wear ring portions 122, 124 can include at least one rib or protrusion 127 that engages and/or mates with the slot 133 to prevent relative movement between the wear ring 100 (when assembled) and the receptacle 24.

FIG. 8B shows another embodiment in which the wear ring 100*b* can comprise a first wear ring portion 222 and a second wear ring portion 224. The first wear ring portion 222 can be substantially a majority of the wear ring 100*b* body. The second wear ring portion 224 can have a transverse cross-section that has size that is substantially the same, slightly smaller, or slightly larger than a transverse cross-section of the cord segment 102. The first wear ring portion 222 can have a corresponding opening 230 to accept, engage, and/or mate with the second wear ring portion 224. Thus, the opening 230 of first wear ring portion 230 can be sized to allow the cord segment 102 to slip or enter an opening 231 of the wear ring 100*b*.

The first and second wear ring portions 222, 224 can have corresponding (male and female) grooves, channels, trenches, recesses, protrusions, projections, knobs, splines, etc. 244, 246 for the first wear ring portion 222 to accept, engage, and/or mate with the second wear ring portion 224 as indicated by assembly arrow 236 in a predetermined manner and/or position to form an assembled wear ring 100*b* as illustrated in, for example, FIGS. 5B and 7B. In some embodiments, the wear ring portions 222, 224 can be joined with any suitable mechanism that can hold the portions 122, 124 together, such as, for example, screws, interference fit mechanisms, snap fit mechanisms, and so forth, which can include using male and female mating parts.

Accordingly, to assemble the wear ring 100*b*, the first wear ring portion 222 can slip onto cord segment 102 and accept the second wear ring portion 224 to form an assembled wear ring 100*b* that encloses or circumscribes the cord segment 102. The transverse cross-section of the cord segment 102 can be smaller than the opening 231 formed by the assembled wear ring 100b. The opening 231 of the assembled wear ring 100b can be substantially circular and sized to position the wear ring 100b on the receptacle 24b as discussed below.

The assembled wear ring 100b can be moved past the cord segment 102 onto the receptacle 24b as indicated by directional arrow 238. In FIG. 8B, a portion of the cord segment 102 near the wear ring 100b has been removed to better illustrate some of the features and functions of the wear ring 100b as discussed herein. The wear ring 100b can have L-shaped brackets 225 that can releasably engage and/or mate with L-shaped brackets 232, 232b of the receptacle 24b. The L-shaped brackets 225, 232, and/or 232b can be anti-movement features as discussed herein. The wear ring 100b can be moved past the cord segment 102 to be positioned near or at the L-shaped brackets 232, 232b of the receptacle 24b (e.g., so that the brackets 225 engage with the brackets 232, 232b). The wear ring 100b can have an opening 231 with a transverse cross-section sized to substantially prohibit radial and/or transverse movement of the wear ring 100b relative to the receptacle 24b near or at the L-shaped brackets 232, 232b. The wear ring 100b can be rotated clockwise (or counter-clockwise in some embodiments) as indicated by rotational arrows 240. In the illustrated embodiment, rotating the wear ring 100b clockwise per the rotational arrows 240 engages the wear ring 100b with the receptacle 24b. Rotating the wear ring 100b counterclockwise opposite the rotational arrows 240 can disengage the wear ring 100b from the receptacle 24b. The L-shaped brackets 232, 232b of the receptacle can engage and/or mate with L-shaped brackets 225 of the receptacle 24b to stop the rotation of the wear ring 100b in a predetermined position relative to the receptacle 24b. For example, the predetermined position can be such that the cutouts 33b of the wear ring 100b substantially line up, coincide, or circumferentially align with the grooves 31, 31b of the receptacles as discussed herein.

In some embodiments, the wear ring 100b can have a screw hole 226 that receives a screw 228. The second wear ring portion 224 can have the screw hole 226. In some embodiments, first wear ring portion 226 can have the screw hole 226. When the first and second wear ring portions 222, 224 are assembled over the cord segment 102 and slid into the predetermined position relative to the receptacle 24b as discussed herein, the screw 228 can be inserted along path line 242 and screwed to engage and/or mate with a notch or opening 234 formed in an L-shaped bracket 232b. When the screw 228 is positioned to be in the notch 234, the wear ring 100b can be prevented from rotating relative to the receptacle 24b, and thus, remain in the predetermined angular position relative to the receptacle 24b. In some embodiments, more than one screw 228 may be used to inhibit movement of the wear ring 100b relative to the receptacle 24b. In some embodiments, the L-shaped brackets 225, 232, 232b can instead be corresponding (male and female) grooves, channels, trenches, recesses, protrusions, projections, knobs, splines, etc. that are not necessarily L-shaped to position the wear ring 100b relative to the receptacle 24b as discussed herein. In some embodiments, movement of the wear ring 100b relative the receptacle 24b can be inhibited with any suitable mechanism, such as, for example, interference fit mechanisms, snap fit mechanisms, tab and groove mechanisms and so forth, which can include using male and female mating parts, and which can be used in combination with or in lieu of the screw 228 as discussed herein. In some embodiments, the suitable mechanisms do not include a rotational step along the rotational arrows 240 as discussed herein. The suitable mechanism can position and inhibit movement of the wear ring 100b relative to the receptacle 24b upon moving the wear ring 100b axially onto the receptacle 24b as discussed herein along directional arrow 238 with, for example, a snap fit mechanism.

In the illustrated embodiment shown in FIG. 8B, a reduction of necessary parts used to assemble and position the wear ring 100b as discussed herein relative to the receptacle 24b can be achieved. Robustness, rigidity, and/or strength of the wear ring 100b can be further achieved by having the first wear ring portion 222 (as one integral piece) form a majority or substantial portion (e.g., ¾ths) of the wear ring 100b, as compared to the second wear ring portion 224. In some embodiments, the second wear ring portion 224 can function as a keystone for completing the assembly of the wear ring 100b as discussed herein. Thus, the wear ring 100b can be secured and/or positioned in the predetermined position relative to the receptacle 24b before or even without the use of screws and/or other securing mechanisms as discussed herein.

In some embodiment, as shown in FIG. 8A, the electrical plug receptacle 24 includes an overmold 134 that fits over a main body 136 of the receptacle 24 to, for example, provide protection against shock and/or abrasion to the main body 136. Embodiments without overmolds are also contemplated and within the scope of the present application. For example, the overmold 134 can be integrally formed with the main body 136. While the figures illustrate an electrical cord in the context of a cord reel, it will be appreciated that a wear ring can be provided on an electrical cord in other contexts, and the present application is not limited to cord reels. For example, the embodiments and concepts discussed herein can be applied to other cord applications, such as, for example, cables for carrying electrical signals, including, but not limited to, Ethernet, USB, HDMI, VGA, and/or the like.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An electrical cord assembly comprising:
   a cord segment having one or more wires;
   an electrical plug receptacle connected to an end of the cord segment, the receptacle including one or more apertures configured to receive an electrical plug to form an electrical connection between the plug and the one or more wires; and
   a wear ring configured to engage and surround at least a portion of the receptacle;
   wherein:
   the wear ring is sized and configured to inhibit at least a portion of a surface of the receptacle adjacent to the one or more apertures from contacting a ground surface when the end of the cord segment is on the ground surface;

the wear ring comprises a plurality of wear ring portions configured to be assembled together to releasably engage and surround the portion of the receptacle; and the wear ring is removable from the electrical cord by disassembling the wear ring portions.

2. The electrical cord assembly of claim 1, wherein a substantial entirety of the surface is prevented from contacting the ground surface when the wear ring is on the receptacle and when the end of the cord segment is dragged along the ground surface.

3. The electrical cord assembly of claim 1, wherein a transverse cross-section of the wear ring is at least as large as a transverse cross-section of the receptacle.

4. The electrical cord assembly of claim 1, wherein a transverse cross-section of the wear ring is larger than a transverse cross-section of the receptacle.

5. The electrical cord assembly of claim 1, wherein a transverse cross-section of the wear ring is substantially at least one of circular or triangular.

6. The electrical cord assembly of claim 1, wherein the surface of the receptacle adjacent to the one or more apertures is flat, the wear ring being sized and configured to substantially prevent the flat surface from contacting a ground surface when the wear ring is on the receptacle and when the end of the cord segment is on the ground surface.

7. The electrical cord assembly of claim 1, wherein the receptacle includes a plurality of surfaces, each surface containing one or more apertures, the wear ring being sized and configured to substantially prevent each of the surfaces from contacting the ground surface when the wear ring is on the receptacle and when the end of the cord segment is on the ground surface.

8. The electrical cord assembly of claim 1, wherein the one or more wires comprises a ground wire, a hot wire, and a neutral wire.

9. The electrical cord assembly of claim 1, wherein the wear ring comprises glass-filled nylon.

10. The electrical cord assembly of claim 1, wherein the wear ring comprises two wear ring portions, wherein at least one of the wear ring portions surrounds at least 180 degrees of a transverse cross-section of the receptacle when the wear ring is on the receptacle.

11. The electrical cord assembly of claim 1, wherein the wear ring portions are configured to be secured with one or more screws.

12. The electrical cord assembly of claim 1, wherein the wear ring is configured to engage with the receptacle in a manner in which the wear ring is not movable with respect to the receptacle.

13. The electrical cord assembly of claim 12, wherein the wear ring includes one or more anti-movement features configured to engage anti-movement features of the receptacle, to prevent movement of the wear ring with respect to the receptacle.

14. An electrical cord comprising:
a cord segment comprising a wire;
a receptacle on an end of the cord segment, the receptacle comprising a connection surface including an aperture, the connection surface configured to receive an adapter to form an electrical connection between the adapter and the wire via the aperture; and
a wear member on the receptacle, the wear member configured to inhibit at least a portion of the connection surface from contacting a ground surface when the receptacle is on the ground surface;
wherein the wire includes a plurality of wires and the aperture includes a plurality of apertures, and wherein the connection surface includes a plurality of connection surfaces configured to receive a plurality of adapters;
wherein the connection surface is a flat surface;
wherein a cross-section of the wear member is at least as large as a cross-section of the receptacle, the cross-sections parallel to each other and substantially perpendicular to a central axis along the cord segment when the cord segment is arranged to be straight;
wherein the connection surface comprises a flat surface and wherein the cross-sections of the wear member and the receptacle are substantially perpendicular to the flat surface of the connection surface;
wherein the wear member is substantially at least one of a circular shape or a triangular shape;
wherein the wear member comprises a cutout configured to provide a preferential orientation of the receptacle relative to the ground surface when the receptacle is on the ground surface, wherein the cutout is circumferentially misaligned with the connection surface of the receptacle;
wherein the wear member comprises a plurality of portions and wherein each of the plurality of portions is engaged with at least one other portion;
wherein the wear member is fixed relative to the receptacle.

15. An electrical cord reel comprising:
a spool member rotatable about a winding axis; and
an electrical cord comprising:
a cord segment having a plurality of wires;
a connector at a first end of the cord segment;
an electrical plug receptacle connected to a second end of the cord segment, the receptacle including one or more apertures configured to receive at least one electrical plug to form an electrical connection between the plug and one or more of the wires; and
a wear ring engaged with and surrounding the receptacle;
wherein:
the wear ring is sized and configured to substantially prevent surfaces of the receptacle adjacent to the one or more apertures from contacting a ground surface when the end of the cord segment is dragged along the ground surface;
the wear ring comprises a plurality of wear ring portions configured to be assembled together to engage and surround the receptacle;
the wear ring is removable from the electrical cord by disassembling the wear ring portions;
the connector is connected to the spool member;
the reel is configured to convey electrical power to the connector;
the electrical cord is configured to become spooled onto the spool member when the spool member rotates in a first direction about the winding axis; and
the electrical cord is configured to become unspooled from the spool member when the spool member rotates in a second direction about the winding axis, the second direction being opposite the first direction.

16. The electrical cord reel of claim 15, wherein a transverse cross-section of the wear ring is at least as large as a transverse cross-section of the receptacle.

* * * * *